United States Patent
Sato et al.

(10) Patent No.: US 10,676,605 B2
(45) Date of Patent: Jun. 9, 2020

(54) ETHYLENE-VINYL ALCOHOL COPOLYMER COMPOSITION, PELLETS, MULTILAYER STRUCTURE, AND PRODUCTION METHOD FOR ETHYLENE-VINYL ALCOHOL COPOLYMER COMPOSITION

(71) Applicant: THE NIPPON SYNTHETIC CHEMICAL INDUSTRY CO., LTD., Osaka (JP)

(72) Inventors: Nobuaki Sato, Osaka (JP); Koji Yamada, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 46 days.

(21) Appl. No.: 15/781,300

(22) PCT Filed: Dec. 28, 2016

(86) PCT No.: PCT/JP2016/089123
§ 371 (c)(1),
(2) Date: Jun. 4, 2018

(87) PCT Pub. No.: WO2017/115848
PCT Pub. Date: Jul. 6, 2017

(65) Prior Publication Data
US 2018/0355163 A1    Dec. 13, 2018

(30) Foreign Application Priority Data
Dec. 28, 2015    (JP) .................... 2015-255784

(51) Int. Cl.
C08L 29/04 (2006.01)
C08L 23/08 (2006.01)
C08K 3/11 (2018.01)
B32B 27/30 (2006.01)
C08K 3/22 (2006.01)

(52) U.S. Cl.
CPC ............ *C08L 29/04* (2013.01); *B32B 27/306* (2013.01); *C08K 3/11* (2018.01); *C08L 23/08* (2013.01); *C08K 2003/2265* (2013.01); *C08K 2003/2272* (2013.01); *C08K 2003/2275* (2013.01)

(58) Field of Classification Search
CPC ............ C08L 29/04; C08L 23/08; C08K 3/11
USPC ........................................... 524/503
See application file for complete search history.

(56) References Cited

U.S. PATENT DOCUMENTS

| | | | |
|---|---|---|---|
| 2012/0248640 A1* | 10/2012 | Tsuboi | C08F 8/12 264/5 |
| 2014/0213701 A1 | 7/2014 | Nonaka et al. | |
| 2016/0229987 A1 | 8/2016 | Kawai et al. | |

FOREIGN PATENT DOCUMENTS

| | | |
|---|---|---|
| CN | 103635526 A | 3/2014 |
| CN | 104185652 A | 12/2014 |
| JP | 58-222102 | 12/1983 |
| JP | S58-206606 A | 12/1983 |
| JP | 2002-045851 | 2/2002 |
| JP | 2006-096816 | 4/2006 |
| JP | 2012-179723 A | 9/2012 |
| JP | 2015-083377 | 4/2015 |
| WO | 2013/146533 A1 | 10/2013 |

OTHER PUBLICATIONS

International Search Report in International Patent Application No. PCT/JP2016/089123, dated Feb. 28, 2017.
International Preliminary Report on Patentability in International Patent Application No. PCT/JP2016/089123, dated Jul. 3, 2018.
Supplemental European Search Report issued in European Patent Application No. 16881822.7 dated Jun. 26, 2019.
JP Office Action issued in JP Patent App. No. 2016-575984 dated Feb. 25, 2020, English translation.
CN Office Action issued in CN Patent App. No. 201680068118.5 dated Jan. 2, 2020, English translation.

* cited by examiner

*Primary Examiner* — Deve V Hall
(74) *Attorney, Agent, or Firm* — Greenblum & Bernstein, P.L.C.

(57) ABSTRACT

An ethylene-vinyl alcohol copolymer composition can be formed into a product having very few minute fisheyes. The ethylene-vinyl alcohol copolymer composition comprises: an ethylene-vinyl alcohol copolymer; and an iron compound; wherein the ethylene-vinyl alcohol copolymer is a saponification product of an ethylene-vinyl ester copolymer prepared by using an organic compound having a half-life of 10 to 300 minutes at 60° C. as a polymerization initiator; wherein an amount of the iron compound is 0.001 to 2 ppm in terms of a metal by weight of the ethylene-vinyl alcohol copolymer composition.

5 Claims, No Drawings

ETHYLENE-VINYL ALCOHOL COPOLYMER COMPOSITION, PELLETS, MULTILAYER STRUCTURE, AND PRODUCTION METHOD FOR ETHYLENE-VINYL ALCOHOL COPOLYMER COMPOSITION

TECHNICAL FIELD

The present disclosure relates to an ethylene-vinyl alcohol copolymer composition mainly containing an ethylene-vinyl alcohol copolymer (hereinafter sometimes referred to simply as "EVOH resin"), pellets produced by using the EVOH resin composition, a multilayer structure, and a production method for the EVOH resin composition. More specifically, the present disclosure relates to an EVOH resin composition that can be formed into a product having very few minute fisheyes, pellets produced by using the EVOH resin composition, a multilayer structure including at least one layer comprising the EVOH resin composition, and a production method for the EVOH resin composition.

BACKGROUND ART

EVOH resins are thermoplastic resins prepared by saponifying an ethylene-vinyl ester copolymer, which is a copolymer of ethylene and a vinyl ester monomer, and are excellent in transparency, gas barrier property (e.g., oxygen barrier property), fragrance retaining property, solvent resistance, oil resistance, mechanical strength and other properties. Therefore, the EVOH resins are generally formed into films, sheets, bottles and the like, which are widely used as packaging materials such as food packaging materials, pharmaceutical product packaging materials, industrial chemical packaging materials and agricultural chemical packaging materials.

In these applications, contamination with colored foreign matter, occurrence of fisheyes and the like are considered problematic. The EVOH resins are susceptible to thermal degradation. When such an EVOH resin stagnates in a forming apparatus in a heat melt forming process, for example, the EVOH resin is liable to be thermally degraded. Thermally degraded pieces of the EVOH resin cause the colored foreign matter and the fisheyes in a formed product when entering the formed product.

Various studies have been conducted to solve this problem. One proposed solution is to use a radical initiator having a half-life of not longer than 2 hours at 60° C. as a polymerization initiator for preparation of an ethylene-vinyl ester copolymer that is to be saponified for production of the EVOH resin (see, for example, PTL 1).

RELATED ART DOCUMENT

Patent Document

PTL 1: JP-A-SH058(1983)-222102

SUMMARY OF INVENTION

The art disclosed in PTL 1 can substantially suppress the occurrence of visibly large fisheyes. In recent years, however, packaging materials are required to be highly transparent, so that the existence of minute fisheyes having diameters of less than 0.2 mm is also considered problematic. Therefore, improvement is still required for solving this problem.

The present disclosure is directed to an EVOH resin composition that can be formed into a product having very few minute fisheyes by a heat melt forming process.

In view of the foregoing, the inventors conducted intensive studies and, as a result, found that an EVOH resin composition produced by saponifying an ethylene-vinyl ester copolymer prepared by using an organic compound having a half-life of 10 to 300 minutes at 60° C. as a polymerization initiator contains an iron compound in an amount of greater than 2 ppm in terms of a metal by weight of the EVOH resin composition, and the iron compound is the cause of minute fisheyes having diameters of less than 0.2 mm.

It is not clear why the iron compound is contained in the EVOH resin as described above. However, it is hypothesized that, when an organic compound highly active at a lower temperature is used as the polymerization initiator and a pump having a stainless-steel column valve is used, the iron compound is inevitably released from the column valve to be contained in the EVOH resin.

The inventors found that, where the amount of the iron compound in the EVOH resin composition prepared by using the specific polymerization initiator is controlled to 0.001 to 2 ppm in terms of a metal by weight of the EVOH resin composition, the occurrence of the minute fisheyes in the product formed by the heat melt forming process can be suppressed.

According to a first inventive aspect, there is provided an EVOH resin composition comprising an EVOH resin and an iron compound, wherein the EVOH resin is a saponification product of an ethylene-vinyl ester copolymer prepared by using an organic compound having a half-life of 10 to 300 minutes at 60° C. as a polymerization initiator, wherein an amount of the iron compound is 0.001 to 2 ppm in terms of a metal by weight of the EVOH resin composition.

According to a second inventive aspect, there is provided a production method for an EVOH resin composition containing an iron compound in an amount of 0.001 to 2 ppm in terms of a metal by weight of the EVOH resin composition, the method including: preparing an ethylene-vinyl ester copolymer by using an organic compound as a polymerization initiator; producing an EVOH resin by saponifying the ethylene-vinyl ester copolymer; and controlling the amount of the iron compound in the EVOH resin and producing the EVOH resin composition; wherein the organic compound has a half-life of 10 to 300 minutes at 60° C.

In the inventive EVOH resin composition, the EVOH resin is a saponification product of the ethylene-vinyl ester copolymer prepared by using the organic compound having a half-life of 10 to 300 minutes at 60° C. as the polymerization initiator, and an amount of the iron compound is 0.001 to 2 ppm in terms of a metal by weight of the EVOH resin composition. A product produced from the inventive EVOH resin composition by the heat melt forming process has very few minute fisheyes, and can be advantageously used for a packaging material required to be highly transparent.

A multilayer structure including at least one layer formed from the inventive EVOH resin composition has very few minute fisheyes, and can be advantageously used for a pharmaceutical product packaging material required to be highly transparent.

Further, the EVOH resin composition containing the iron compound in an amount of 0.001 to 2 ppm in terms of a metal by weight of the EVOH resin composition can be produced by an EVOH resin composition production method including: preparing the ethylene-vinyl ester copolymer by using the organic compound as the polymerization initiator; producing the EVOH resin by saponifying the ethylene-vinyl ester copolymer; and controlling the amount of the iron compound in the EVOH resin and producing the EVOH resin composition; wherein the organic compound has a half-life of 10 to 300 minutes at 60° C. A product produced from the EVOH resin composition by the heat melt forming process has very few minute fisheyes, and can be advantageously used for a packaging material required to be highly transparent.

Where the step of controlling the amount of the iron compound in the EVOH resin and producing the EVOH resin composition includes the step of bringing the EVOH resin into contact with an extraction solvent, the amount of the iron compound can be easily controlled.

DESCRIPTION OF EMBODIMENTS

The present disclosure will hereinafter be described in detail by way of embodiments thereof. However, it should be understood that the embodiments are illustrative of the disclosure but not limitative of the disclosure.

An inventive EVOH resin composition contains an EVOH resin prepared by a specific production method, and a specific amount of an iron compound.

The EVOH resin composition will hereinafter be described in detail.

The EVOH resin to be used in the present disclosure is a water-insoluble thermoplastic resin prepared by saponifying an ethylene-vinyl ester copolymer, which is a copolymer of ethylene and a vinyl ester monomer. The inventive EVOH resin composition contains the EVOH resin as abase resin. That is, the proportion of the EVOH resin in the EVOH resin composition is typically not less than 90 wt. %, preferably not less than 95 wt. %, more preferably not less than 97 wt. %.

A production method for the EVOH resin will be described below.

[Ethylene-Vinyl Ester Copolymer]

In an inventive EVOH resin composition production method, ethylene and the vinyl ester monomer are polymerized (are allowed to react with each other) in a polymerization solvent in the presence of a specific polymerization initiator, whereby the ethylene-vinyl ester copolymer is prepared.

Other exemplary polymerization methods include a suspension polymerization method, an emulsion polymerization method and a bulk polymerization method, but the solution polymerization method is industrially preferred. The polymerization may be performed in a continuous system or in a batch system.

A typical example of the vinyl ester monomer is vinyl acetate, which is easily commercially available and ensures a higher impurity treatment efficiency in the production process. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate and vinyl versatate, and aromatic vinyl esters such as vinyl benzoate. The aliphatic vinyl esters typically have 3 to 20 carbon atoms, preferably 4 to 10 carbon atoms, particularly preferably 4 to 7 carbon atoms. These vinyl esters may be used alone or, as required, a plurality of vinyl esters may be selected from these vinyl esters to be used in combination.

To introduce ethylene into the copolymer, an ethylene pressurization polymerization method is typically employed. The amount of ethylene to be introduced may be controlled by controlling the pressure of ethylene typically within a range of 2 to 8 MPa.

In the present disclosure, a copolymerizable ethylenically unsaturated monomer may be added to ethylene and the vinyl ester monomer in an amount that does not impair the required properties of the EVOH resin (e.g., in an amount of not greater than 10 mol %) to be copolymerized with ethylene and the vinyl ester monomer. Known unsaturated monomers are usable as the unsaturated monomer. Specific examples of the unsaturated monomer include: α-olefins such as propylene, isobutene, α-octene, α-dodecene and α-octadecene; hydroxyl-containing α-olefins including hydroxyalkyl-containing α-olefins such as 3-buten-1-ol, 4-penten-1-ol and 2-methylene-1,3-propanediol, 1,2-diol-containing α-olefins such as 3-butene-1,2-diol, and esterification products, acylation products and other derivatives of these hydroxyl-containing α-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyl-2-methylenepropane and 1,3-dibutyroyloxy-2-methylenepropane; unsaturated carboxylic acids, and salts, partial alkyl esters, full alkyl esters, nitriles, amides and anhydrides of the unsaturated carboxylic acids; unsaturated sulfonic acids and salts of the unsaturated sulfonic acids; and vinylsilane compounds, vinyl chloride and styrene. These comonomers may be used alone or in combination.

Typical examples of the polymerization solvent include: lower alcohols such as methanol, ethanol, propanol and butanol; and ketones such as acetone and methyl ethyl ketones. Methanol is industrially preferred.

The amount of the polymerization solvent to be used is properly selected according to the intended polymerization degree of the copolymer in consideration of the chain transfer constant of the polymerization solvent. Where methanol is used as the polymerization solvent, for example, the amount of the polymerization solvent is determined so that the weight ratio between the polymerization solvent (S) and the monomer (M) is S/M=0.01 to 10, preferably 0.05 to 7.

The inventive EVOH resin composition has a feature that a specific polymerization initiator is used for the preparation of the ethylene-vinyl ester copolymer.

The specific polymerization initiator is an organic compound having a half-life at 60° C. of 10 to 300 minutes, preferably 20 to 250 minutes, particularly preferably 30 to 200 minutes. If the half-life at 60° C. is excessively short, the polymerization reaction tends to run away and, therefore, is difficult to control. If the half-life is excessively long, on the other hand, it will be necessary to add the polymerization initiator in an excessive amount and, therefore, a part of the polymerization initiator left unreacted is liable to cause post-polymerization, resulting in gelation and fisheyes.

An organic peroxide or an azo compound may be preferably used as the organic compound. Specific examples of the organic peroxide include: peroxydicarbonates such as di-n-propyl peroxydicarbonate, di-iso-propyl peroxydicarbonate, di(4-t-butylcyclohexyl) peroxydicarbonate, di-sec-butyl peroxydicarbonate, diisopropyl peroxydicarbonate and di(2-ethylhexyl) peroxydicarbonate; peroxy esters such as cumyl peroxyneodecanoate, 1,1,3,3-tetramethylbutyl peroxyneodecanoate, t-hexyl peroxyneodecanoate, t-butyl peroxyneodecanoate, t-hexyl peroxypivalate and t-butyl peroxypivalate; and diacyl peroxides such as diisobutyl peroxide. Specific examples of the azo compound include 2,2'-azobis-(2,4-dimethylvaleronitrile) and 2,2'-azobis-(4- methoxy-2,4-dimethylvaleronitrile). These organic compounds may be used alone or in combination. Of these organic compounds, the organic peroxides are preferred for productivity. Particularly, the peroxy esters are preferred, and t-butyl peroxyneodecanoate is especially preferred.

The amount of the polymerization initiator to be used is typically 0.001 to 0.2 parts by weight, preferably 0.005 to 0.1 part by weight, based on 100 parts by weight of the vinyl ester monomer. If the amount of the polymerization initiator is excessively small, the polymerization reaction tends to proceed very slowly, resulting in lower productivity. If the amount of the polymerization initiator is excessive, the polymerization reaction tends to run away and, therefore, is difficult to control.

The reaction temperature for the copolymerization reaction depends on the polymerization solvent to be used and the pressure, but is typically not higher than the boiling point of the polymerization solvent, preferably 40° C. to 80° C., particularly preferably 55° C. to 80° C. If the reaction temperature is excessively low, a longer period will be required for the polymerization reaction, and a greater amount of the polymerization initiator will be required to reduce the polymerization period. On the other hand, an excessively high reaction temperature is not preferred with a difficulty in polymerization control.

In the batch polymerization system, the polymerization period is preferably 4 to 10 hours, more preferably 6 to 9 hours. If the polymerization period is excessively short, a higher polymerization temperature or a greater amount of the polymerization initiator will be required. On the other hand, an excessively long polymerization period is disadvantageous in productivity. In the continuous polymerization system, an average retention time during which the EVOH resin composition is retained in a polymerization can is preferably 2 to 8 hours, more preferably 2 to 6 hours. If the retention time is excessively short, a higher polymerization temperature or a greater amount of the polymerization initiator will be required. On the other hand, an excessively long retention time will be disadvantageous in productivity.

The polymerization percentage of the vinyl ester monomer is preferably set as high as possible within a polymerization controllable range for productivity, preferably 30 to 60%. An excessively low polymerization percentage will be disadvantageous in productivity because a greater amount of the vinyl ester monomer is left unreacted. On the other hand, an excessively high polymerization percentage is not preferred with a difficulty in polymerization control.

[EVOH Resin]

The ethylene-vinyl ester copolymer thus prepared is saponified, after a part of the vinyl ester monomer left unreacted is removed therefrom as required. Thus, a saponification product of the ethylene-vinyl ester copolymer, i.e., the EVOH resin, is produced.

After the unreacted vinyl ester monomer is thus removed, the amount of the residual vinyl ester monomer is preferably not greater than 0.1 wt. %, more preferably not greater than 0.05 wt. %.

The saponification may be performed by an ordinary method. For example, the saponification is performed in the presence of a saponification catalyst (e.g., an alkali metal compound such as a hydroxide or an alkoxide of sodium or potassium, or an acid catalyst such as hydrochloric acid, sulfuric acid or acetic acid) in a homogeneous system employing an alcohol solvent such as methanol or in a heterogeneous system employing a solvent mixture prepared by adding water to an alcohol such as methanol or ethanol.

For prevention of coloration, as required, acetone, hydrazine or a long-chain alkyl amine may be added to the heterogeneous saponification system.

In the present disclosure, the EVOH resin prepared by the saponification typically has a saponification degree of 80 to 100 mol %, particularly 90 to 100 mol %, more preferably 95 to 100 mol %. If the saponification degree is excessively low, the EVOH resin tends to be poorer in thermal stability during a melt forming process, and a product produced from the EVOH resin by the melt forming process tends to be poorer in mechanical strength and gas barrier property.

The EVOH resin typically has an ethylene structural unit content of 20 to 60 mol %, preferably 25 to 50 mol %, particularly preferably 25 to 35 mol %, as measured in conformity with ISO14663. If the ethylene structural unit content is excessively low, the EVOH resin tends to be poorer in higher-humidity gas barrier property and melt formability. If the ethylene structural unit content is excessively high, on the other hand, the EVOH resin tends to be poorer in gas barrier property.

In the present disclosure, the EVOH resin typically has a melt flow rate (MFR) of 0.1 to 100 g/10 minutes, particularly preferably 0.5 to 50 g/10 minutes, further preferably 1 to 30 g/10 minutes as measured at 210° C. with a load of 2160 g. If the melt flow rate is excessively low, a higher torque tends to occur in an extruder in the forming process to result in difficulty in extrusion. If the melt flow rate is excessively high, a product produced from the EVOH resin by a heat stretching forming process tends to be poorer in appearance and gas barrier property.

The MFR may be controlled by controlling the polymerization degree of the EVOH resin and by adding a cross-linking agent and/or a plasticizing agent to the EVOH resin composition.

[EVOH Resin Composition and Pellets of EVOH Resin Composition]

The inventive EVOH resin composition has a feature such that an amount of the iron compound is 0.001 to 2 ppm in terms of a metal by weight of the EVOH resin composition. The amount of the iron compound is preferably 0.01 to 1.5 ppm, particularly preferably 0.1 to 1 ppm, especially preferably 0.2 to 0.6 ppm, in terms of a metal. If the amount of the iron compound is excessively high, a product produced from the EVOH resin composition by the heat melt forming process tends to have a greater number of minute fisheyes.

The amount of the iron compound may be determined through measurement by atomic absorption spectrometry. More specifically, a sample of pellets of the EVOH resin composition is weighed on a platinum dish, which is in turn placed in a microwave muffle furnace to completely ash the sample. Then, the resulting ash of the sample is treated with hydrochloric acid, and analyzed by an atomic absorption spectrometer with the use of an iron standard solution as a reference.

Examples of the iron compound to be present in the EVOH resin composition include ferric oxide, ferrosoferric oxide, ferrous chloride, ferric chloride, ferrous hydroxide, ferric hydroxide, ferrous oxide, iron sulfate and iron phosphate, which may be each present in an ionized form or in the form of a complex coordinated with the resin or other ligands.

In the present disclosure, the method of controlling the amount of the iron compound in the EVOH resin composition to the range specified by the present disclosure is not particularly limited. It is not clear how the iron compound is present in the resin composition. However, it is hypothesized that, when the EVOH resin is produced by using the aforementioned specific polymerization initiator with the use of a pump having a stainless-steel column valve, the iron compound is inevitably released from the column valve to be contained in the EVOH resin. In this case, the amount of the iron compound in the EVOH resin composition is generally greater than 2 ppm in terms of a metal by weight of the EVOH resin composition. Therefore, it is necessary to remove the iron compound.

Exemplary methods of removing the iron compound from the EVOH resin composition having an iron compound amount of greater than 2 ppm in terms of a metal by weight of the EVOH resin composition include: (i) a method in which the iron compound is leached from the EVOH resin composition pellets by bringing the EVOH resin composition pellets into contact with an extraction solvent containing no iron compound or removed of the iron compound, and then the EVOH resin composition pellets are dried; and (ii) a method in which the EVOH resin composition is homogeneously dissolved in water/alcohol and the iron compound is captured and separated from the resulting water/alcohol solution with the use of a chelate agent, followed by pelletization.

Particularly, the method (i) is generally used because of its simplicity.

In these methods, known processes may be employed for the pelletization of the EVOH resin composition. For example, an alcohol/water mixture solution of the EVOH resin composition is extruded into a strand or a sheet in a solidification liquid, and then the strand or the sheet is cut into pellets. Other exemplary processes include a process in which the EVOH resin is cut in a melted state, and a process in which the EVOH resin composition solution is extruded from holes, and the resulting strands are cut by a cutter and solidified in solidification liquid.

The EVOH resin composition pellets preferably each have a cylindrical shape, a spherical shape or the like. The cylindrical EVOH resin composition pellets preferably each have a diameter of 1 to 10 mm and a length of 1 to 10 mm. The spherical EVOH resin composition pellets preferably each have a diameter of 1 to 10 mm.

The method (i) will be described in detail. In the method (i), the EVOH resin composition pellets are preferably porous and hydrous EVOH resin composition pellets each having a microporous internal structure in which micropores each having a diameter of about 0.1 to about 10 μm are uniformly distributed. The porous and hydrous EVOH resin composition pellets are typically produced by properly controlling the concentration (20 to 80 wt. %) of the EVOH resin in the water/alcohol mixture solution of the EVOH resin composition, an extrusion temperature (45° C. to 70° C.), the type of solvent (water/alcohol mixture solvent having a weight ratio of water/alcohol=80/20 to 5/95), the temperature (1° C. to 20° C.) of the solidification liquid bath, the retention time (0.25 to 30 hours), and the amount (0.02 to 2 wt. %) of the EVOH resin in the solidification liquid bath when the water/alcohol mixture solution of the EVOH resin composition is extruded into the strand or the sheet in the solidification liquid. A typical example of the solidification liquid is water.

The iron compound present in the EVOH resin can be efficiently leached from the porous and hydrous EVOH resin composition pellets in the step of bringing the EVOH resin composition into contact with the extraction solvent.

Examples of the extraction solvent include water, lower alcohols such as methanol, ethanol and propanol, and a water/alcohol mixture. The weight ratio between water and the alcohol in the water/alcohol mixture solution is typically 99/1 to 1/99. These extraction solvents are free from the iron compound or removed of the iron compound. The iron compound leached in the extraction solvent may be removed, for example, by precipitating the iron compound from the extraction solvent with the use of a phosphate compound or a chelate compound, or through distillation or ion exchange with the use of an ion-exchange resin or the like.

The temperature of the extraction solvent to be used in the step of bringing the EVOH resin composition into contact with the extraction solvent is typically 15° C. to 40° C., preferably 25° C. to 30° C. If the temperature of the extraction solvent is excessively high, product pellets are liable to be whitened. If the temperature of the extraction solvent is excessively low, the efficiency of the extraction tends to be reduced. The bath ratio (the weight ratio between the extraction solvent and the pellets) is typically 0.5 to 10, preferably 1.5 to 3. If the bath ratio is excessively high, the productivity tends to be reduced. If the bath ratio is excessively low, the efficiency of the extraction tends to be reduced. A period during which the porous and hydrous EVOH resin composition pellets are kept in contact with the extraction solvent is typically 1 to 24 hours, particularly preferably 2 to 16 hours. If this period is excessively long, the productivity tends to be reduced. If the period is excessively short, the efficiency of the extraction tends to be reduced.

The porous and hydrous EVOH resin composition pellets subjected to the step of bringing the EVOH resin composition into contact with the extraction solvent is further subjected to the drying step. Various drying processes may be employed in the drying step. Exemplary drying processes include: a fluidized drying process in which the substantially pelletized EVOH resin composition is dried while being agitated and spread mechanically or by hot air; and a stationary drying process in which the substantially pelletized EVOH resin composition is dried without the agitation, the spreading and other dynamic action. Exemplary dryers for the fluidized drying process include a drum/groove type agitation dryer, a round pipe dryer, a rotary dryer, a fluid bed dryer, a vibrating fluid bed dryer and a conical rotor type dryer. Exemplary dryers for the stationary drying process include non-material-moving type dryers such as a batch box type dryer, and material-moving type dryers such as a band dryer, a tunnel dryer and a vertical dryer. The fluidized drying process and the stationary drying process may be used in combination.

In the drying process, air or an inert gas (nitrogen gas, helium gas, argon gas or the like) is used as a heating gas. The temperature of the heating gas is preferably 40° C. to 150° C. for the productivity and for prevention of the thermal degradation of the EVOH resin composition pellets. The period for the drying process depends on the water content and the amount of the EVOH resin composition pellets to be dried, but is typically 15 minutes to 72 hours for the productivity and for the prevention of the thermal degradation of the EVOH resin composition pellets.

The inventive EVOH resin composition pellets thus produced typically have a water content of 0 to 0.5 wt. %, preferably 0.1 to 0.3 wt. %, particularly preferably 0.1 to 0.2 wt. %. The EVOH resin composition pellets are typically subjected to a known melt forming process. If the water content is excessively high, the EVOH resin composition is liable to be foamed in the melt forming process. If the water content is excessively low, the EVOH resin composition is liable to be thermally degraded due to excessive drying.

In the present disclosure, the water content of the EVOH resin composition pellets is measured and calculated in the following manner.

The weight ($W_1$) of the EVOH resin composition pellets is measured by an electronic balance, and the EVOH resin composition pellets are dried at 150° C. for 5 hours in a hot air dryer and cooled for 30 minutes in a desiccator. Then, the weight ($W_2$) of the resulting pellets is measured. The water content of the EVOH resin composition pellets is calculated from the following expression:

Water content (wt. %)=$[(W_1-W_2)/W_1] \times 100$

In the aforementioned manner, the inventive EVOH resin composition and the inventive EVOH resin composition pellets are produced.

The inventive EVOH resin composition may further contain additives and other thermoplastic resin generally added to the EVOH resin in proper amounts that do not impair the effects of the present disclosure (typically in amounts of not greater than 5 wt. %, preferably not greater than 1 wt. %).

The inventive EVOH resin composition has an effect such that a product produced from the EVOH resin composition by the heat melt forming process has very few minute fisheyes. Where the inventive EVOH resin composition is extruded into a 30-μm thick film by means of a single-screw extruder, for example, the number of fisheyes each having a diameter of less than 0.2 mm in a 10 cm×10 cm area of the film is typically 0 to 5, further 0.01 to 3, particularly 0.1 to 1.

[Multilayer Structure]

An inventive multilayer structure includes at least one layer comprising the inventive EVOH resin composition. The layer comprising the inventive EVOH resin composition (hereinafter referred to simply as "resin composition layer") is laminated with other base material mainly containing a thermoplastic resin other than the inventive EVOH resin composition (the resin used as the base material being hereinafter sometimes referred to simply as "base resin"), whereby the resulting multilayer structure is imparted with sufficient strength. Further, the resin composition layer is protected from an influence of water or the like, and is imparted with other functions.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure at a main chain and/or a side chain); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylate; ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acryl resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones.

Of these resins, the polyamide resins, the polyolefin resins, the polyester resins and the polystyrene resins, which are hydrophobic resins, are preferred. Further, the polyolefin resins such as the polyethylene resins, the polypropylene resins and the polycycloolefin resins, and the unsaturated carboxyl-modified polyolefin resins obtained by modifying these polyolefin resins are more preferred, and the polycycloolefin resins are particularly preferred as the hydrophobic resins.

Where layers a (a1, a2, . . . ) of the inventive resin composition and layers b (b1, b2, . . . ) of the base resin are stacked to form the multilayer structure, possible combinations of the layers a and the layers b include a/b, b/a/b, a/b/a, a1/a2/b, a/b1/b2, b2/b1/a/b1/b2, b2/b1/a/b1/a/b1/b2 and the like. Where the multilayer structure is configured to include recycle layers R obtained by recycling cutoff pieces and defective products occurring during the production of the multilayer structure and melt-forming the recycled material (a mixture including the inventive EVOH resin composition and the thermoplastic resin other than the inventive EVOH resin composition), possible combinations of the layers a, the layers b and the layers R include b/R/a, b/R/a/b, b/R/a/R/b, b/a/R/a/b, b/R/a/R/a/R/b and the like. The total number of the layers of the multilayer structure is typically 2 to 15, preferably 3 to 10.

In the aforementioned layered configuration, an adhesive resin layer containing an adhesive resin may be provided between the respective layers as required.

Known adhesive resins are usable as the adhesive resin. The adhesive resin is properly selected according to the type of the thermoplastic resin to be used for the base resin layer "b". Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride and polyolefin resins graft-modified with maleic anhydride, which may be used alone or in combination as a mixture.

Where the adhesive resin layer is provided between the layer of the inventive resin composition and the base resin layer in the multilayer structure, the adhesive resin layer is present on at least one of opposite sides of the resin composition layer and, therefore, the adhesive resin is preferably hydrophobic.

The base resin and the adhesive resin may contain a plasticizer, a filler, a clay (montmorillonite or the like), a colorant, an antioxidant, an antistatic agent, a lubricant, a nucleating agent, an antiblocking agent, a wax and the like in amounts that do not impair the effects of the present disclosure (e.g., in amounts of not greater than 30 wt. %, preferably not greater than 10 wt. %).

A conventional stacking method may be employed for stacking the layer of the inventive EVOH resin composition and the layer of the base resin (optionally with the adhesive resin layer provided between the layers). Examples of the stacking method include: a method in which a film or a sheet of the inventive EVOH resin composition is laminated with the base resin by melt extrusion; a method in which the base resin layer is laminated with the inventive EVOH resin composition by melt extrusion; a method in which the EVOH resin composition and the base resin are coextruded; a method in which the layer of the inventive EVOH resin composition and the layer of the base resin are bonded together by dry laminating with the use of a known adhesive agent such as an organic titanium compound, an isocyanate compound, a polyester compound or a polyurethane compound; and a method in which a solution of the EVOH resin composition is applied on the base resin layer and a solvent is removed from the applied solution. Of these methods, the coextrusion method is preferred in consideration of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. A roll drawing method, a tenter drawing method, a tubular drawing method, a draw blowing method or a vacuum pressure forming method having a higher draw ratio may be employed for the stretching process. A temperature for the drawing is typically selected from a range of 40° C. to 170° C., preferably about 60° C. to about 160° C., around the melting point of the multilayer structure. If the drawing temperature is excessively low, poorer drawability will result. If the drawing temperature is excessively high, it will be difficult to ensure stable drawing.

The resulting multilayer structure may be further subjected to a heat-setting process to ensure dimensional stability after the drawing. The heat-setting process may be performed in a known manner. For example, the drawn multilayer structure (drawn film) is typically heat-treated at 80° C. to 180° C., preferably 100° C. to 165° C., for about 2 to about 600 seconds, while being kept tense.

Where the drawn multilayer film produced by using the inventive resin composition is used as a shrinkable film, for example, the drawn film is preferably cold-set so as to be imparted with a heat-shrinkable property by applying cold air over the drawn film without performing the above heat-setting process.

In some case, a cup-shaped or tray-shaped multilayer container may be produced from the inventive multilayer structure. For the production of the multilayer container, an ordinary drawing process is employed. Specific examples of the drawing process include a vacuum forming method, a pressure forming method, a vacuum pressure forming method and a plug-assisted vacuum pressure forming method. Where a tube-shaped or bottle-shaped multilayer container is produced from a multilayer parison (a hollow tubular preform to be blown), a blow molding process is employed. Specific examples of the blow molding process include an extrusion blow molding method (a twin head type, a mold shift type, a parison shift type, a rotary type, an accumulator type, a horizontal parison type and the like), a cold parison blow molding method, an injection blow molding method and a biaxial stretching blow molding method (an extrusion type cold parison biaxial stretching blow molding method, an injection type cold parison biaxial stretching blow molding method, an injection inline type biaxial stretching blow molding method and the like). As required, the resulting multilayer structure may be subjected to a heating process, a cooling process, a rolling process, a printing process, a dry laminating process, a solution or melt coating process, a bag forming process, a deep drawing process, a box forming process, a tube forming process, a splitting process or the like.

The thickness of the multilayer structure (or the drawn multilayer structure) and the thicknesses of the resin composition layer, the base resin layer and the adhesive resin layer of the multilayer structure are properly determined according to the layered configuration, the type of the base resin, the type of the adhesive resin, and the use purpose, the package shape, the required physical properties and the like of the multilayer structure. The thickness of the multilayer structure (or the drawn multilayer structure) is typically 10 to 5000 μm, preferably 30 to 3000 μm, particularly preferably 50 to 2000 μm. The thickness of the resin composition layer is typically 1 to 500 μm, preferably 3 to 300 μm, particularly preferably 5 to 200 μm. The thickness of the base resin layer is typically 5 to 3000 μm, preferably 10 to 2000 μm, particularly preferably 20 to 1000 μm. The thickness of the adhesive resin layer is typically 0.5 to 250 μm, preferably 1 to 150 μm, particularly preferably 3 to 100 μm.

The thickness ratio between the resin composition layer and the base resin layer of the multilayer structure (resin composition layer/base resin layer) (if these layers each include a plurality of layers, the thickness ratio between the thickest one of the resin composition layers and the thickest one of the base resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles and other containers and lids produced from the film, the sheet or the drawn film formed in the aforementioned manner are useful as packaging material containers for general foods, condiments such as mayonnaise and dressing, fermented foods such as miso, fat and oil such as salad oil, beverages, cosmetics and pharmaceutical products.

Particularly, the layer of the inventive EVOH resin composition includes very few minute fisheyes and, therefore, is particularly useful for pharmaceutical product packaging materials (e.g., an infusion solution bag) required to be highly transparent.

EXAMPLES

The present disclosure will hereinafter be described more specifically by way of examples thereof. However, it should be understood that the present disclosure be not limited to the examples within the scope of the present disclosure.

In the following examples, "parts" means "parts by weight" unless otherwise specified.

Example 1

An EVOH resin (having an ethylene structural unit content of 29 mol %, a saponification degree of 99.7 mol %, and an MFR of 8 g/10 minutes as measured at 210° C. with a load of 2160 g) was prepared in the form of a water/methanol solution (having a water/methanol weight ratio of 40/60 and an EVOH resin content of 36 wt. %) by preparing an ethylene-vinyl acetate copolymer with the use of t-butyl peroxydecanoate (having a half-life of 100 minutes at 60° C.) as a polymerization initiator by means of an apparatus including a pump having an in-line stainless-steel column valve, and saponifying the resulting ethylene-vinyl acetate copolymer. The solution was extruded into strands through holes of a die in a solidification bath, and the strands were solidified and cut into hydrous pellets (having a water content of 60%) by a cutter. The hydrous pellets were immersed in water preliminarily removed of an iron compound by treatment with a phosphate compound with a bath ratio (an extraction solvent/hydrous pellet weight ratio) of 2 at 30° C. for 240 minutes, and then placed still in a hot air dryer at 120° C. for 10 hours. Thus, EVOH resin composition pellets were produced.

The EVOH resin composition pellets thus produced were ashed, and the resulting ash was analyzed by the atomic absorption spectrometry to determine the amount of the iron compound in terms of a metal by weight of the EVOH resin composition. More specifically, the weight of a sample of the EVOH resin composition pellets was first measured on a platinum dish, which was in turn placed in a microwave muffle furnace to completely ash the sample. Then, 2 ml of hydrochloric acid was added to the resulting ash of the sample by a pipette, and the resulting sample was analyzed by an atomic absorption spectrometer using an iron standard solution as a reference. The results are shown below in Table 1.

The EVOH resin composition pellets produced in the aforementioned manner were formed into a single layer film (having a thickness of 30 μm) under the following conditions:
Extruder: Having a diameter (D) of 40 mm and an L/D ratio of 28
Screw: Full flight type having a compression ratio of 3.5
Screen pack: 90/120/90 mesh
Die: Coat hanger type having a width of 450 mm
Temperature setting: C1/C2/C3/C4/A/D=190/210/230/230/220/220° C.
Screw rotation speed: 10 rpm
Take-up speed: 3 m/minute
Roll temperature: 80° C.

The number of fisheyes each having a diameter of less than 0.2 mm was counted in ten 10 cm×10 cm areas of the resulting single layer film, and the fisheye numbers for the ten areas (n=10) were averaged.

The results are shown below in Table 1.

Example 2

An EVOH resin (having an ethylene structural unit content of 32 mol %, a saponification degree of 99.7 mol %, and an MFR of 12 g/10 minutes as measured at 210° C. with a load of 2160 g) was prepared in the form of a water/methanol solution (having a water/methanol weight ratio of 35/65 and an EVOH resin content of 39 wt. %) by preparing an ethylene-vinyl acetate copolymer with the use of t-butyl peroxydecanoate (having a half-life of 100 minutes at 60° C.) as a polymerization initiator by means of an apparatus including a pump having an in-line stainless-steel column valve, and saponifying the resulting ethylene-vinyl acetate copolymer. The solution was extruded into strands through holes of a die in a solidification bath, and the strands were solidified and cut into hydrous pellets (having a water content of 58%) by a cutter. The hydrous pellets were immersed in water preliminarily removed of the iron compound by treatment with a phosphate compound with a bath ratio (an extraction solvent/hydrous pellet weight ratio) of 2 at 30° C. for 240 minutes, and then placed still in a hot air dryer at 120° C. for 10 hours. Thus, EVOH resin composition pellets were produced. Then, a single-layer film was formed from the EVOH resin composition pellets thus produced, and then evaluated in the same manner as in Example 1.

The results are shown below in Table 1.

Comparative Example 1

An EVOH resin (having an ethylene structural unit content of 44 mol %, a saponification degree of 99.7 mol %, and an MFR of 12 g/10 minutes as measured at 210° C. with a load of 2160 g) was prepared in the form of a water/methanol solution (having a water/methanol weight ratio of 20/80 and an EVOH resin content of 36 wt. %) by preparing an ethylene-vinyl acetate copolymer with the use of t-butyl peroxydecanoate (having a half-life of 100 minutes at 60° C.) as a polymerization initiator by means of an apparatus including a pump having an in-line stainless-steel column valve, and saponifying the resulting ethylene-vinyl acetate copolymer. The solution was extruded into strands through holes of a die in a solidification bath, and the strands were solidified and cut into hydrous pellets (having a water content of 60%) by a cutter. The hydrous pellets were immersed in water not subjected to treatment with a phosphate compound with a bath ratio (an extraction solvent/hydrous pellet weight ratio) of 2 at 30° C. for 240 minutes, and then placed still in a hot air dryer at 118° C. for 10 hours. Thus, EVOH resin composition pellets were produced. Then, a single-layer film was formed from the EVOH resin composition pellets thus produced, and then evaluated in the same manner as in Example 1.

The results are shown below in Table 1.

TABLE 1

|  | Amount (ppm) of iron compound in terms of metal by weight of EVOH resin composition | Number of fisheyes per 100 cm$^2$ |
| --- | --- | --- |
| Example 1 | 0.4 | 0.2 |
| Example 2 | 0.8 | 0.9 |
| Comparative Example 1 | 2.8 | 6.0 |

The results for Examples indicate that the single-layer film produced from the inventive EVOH resin composition pellets containing the iron compound in an amount not greater than the predetermined amount has very few minute fisheyes each having a diameter of less than 0.2 mm.

While specific forms of the embodiments of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The inventive EVOH resin composition can be advantageously used for packaging materials required to be highly transparent, because a product produced from the inventive EVOH resin composition by the heat melt forming process has very few minute fisheyes.

The invention claimed is:

1. An ethylene-vinyl alcohol copolymer composition comprising:
  an ethylene-vinyl alcohol copolymer; and
  an iron compound;
  wherein the ethylene-vinyl alcohol copolymer is a saponification product of an ethylene-vinyl ester copolymer prepared by using an organic compound having a half-life of 10 to 300 minutes at 60° C. as a polymerization initiator, and wherein an amount of the iron compound is 0.001 to 2 ppm in terms of a metal by weight of the ethylene-vinyl alcohol copolymer composition.

2. Pellets comprising the ethylene-vinyl alcohol copolymer composition according to claim 1.

3. A multilayer structure comprising at least one layer comprising the ethylene-vinyl alcohol copolymer composition according to claim 1.

4. A production method for producing an ethylene-vinyl alcohol copolymer composition, comprising:

preparing an ethylene-vinyl ester copolymer by using an organic compound as a polymerization initiator;

producing an ethylene-vinyl alcohol copolymer by saponifying the ethylene-vinyl ester copolymer; and controlling the amount of the iron compound in the ethylene-vinyl alcohol copolymer and producing the ethylene-vinyl alcohol copolymer composition;

thereby producing the ethylene-vinyl alcohol copolymer composition according to claim 1.

5. The ethylene-vinyl alcohol copolymer composition production method according to claim 4, wherein the controlling the amount of the iron compound in the ethylene-vinyl alcohol copolymer and producing the ethylene-vinyl alcohol copolymer composition comprises bringing the ethylene-vinyl alcohol copolymer into contact with an extraction solvent.

* * * * *